Feb. 20, 1951 J. C. GIBSON 2,542,506
MAGNETIC RECORDER UTILIZING AN ENDLESS RECORD WEB
Filed Sept. 13, 1948
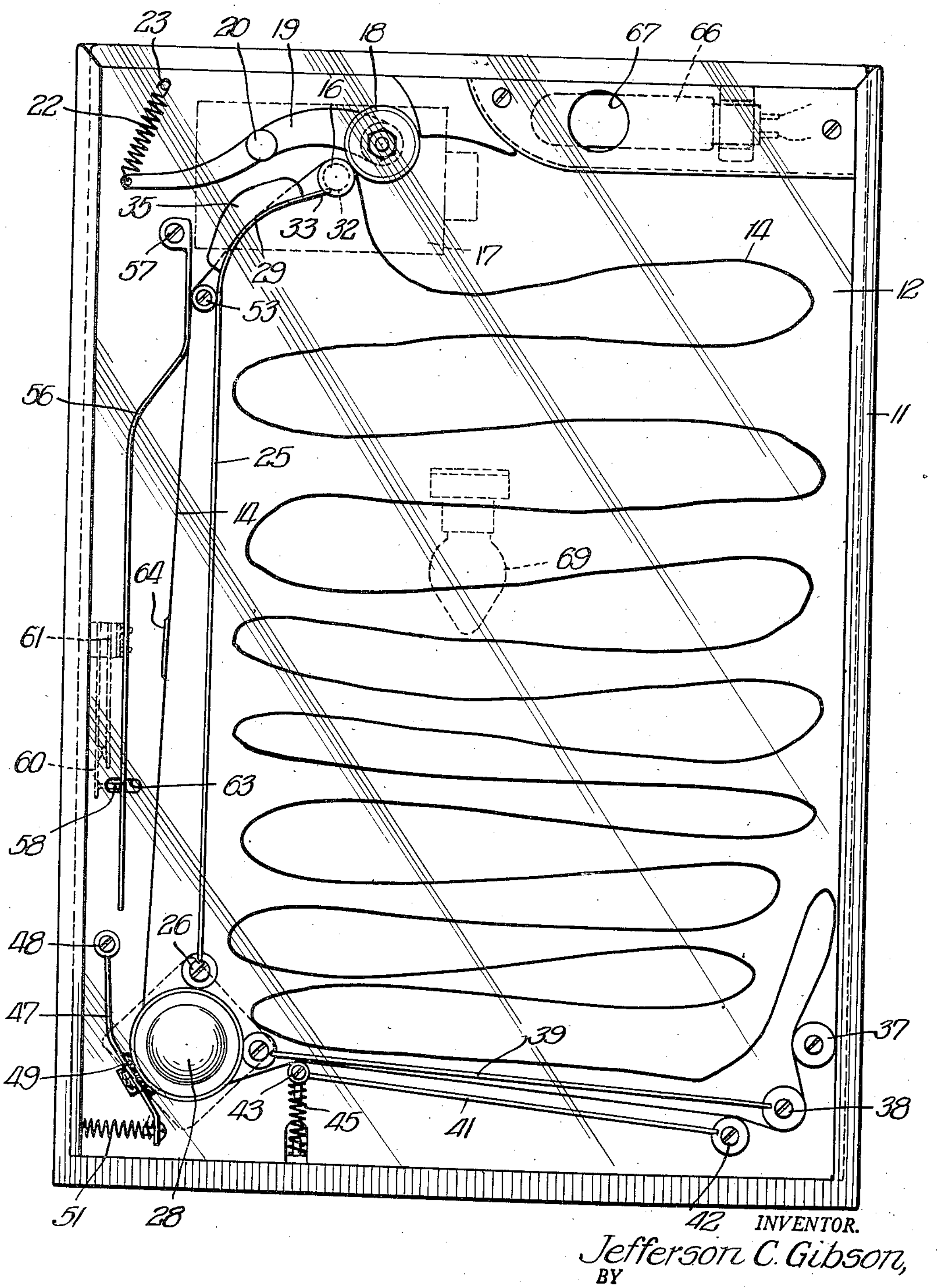
INVENTOR.
Jefferson C. Gibson,
BY
Wilkinson, Huxley, Byron & Hume
Attys.

Patented Feb. 20, 1951

2,542,506

UNITED STATES PATENT OFFICE 2,542,506

MAGNETIC RECORDER UTILIZING AN ENDLESS RECORD WEB

Jefferson C. Gibson, Chicago, Ill.

Application September 13, 1948, Serial No. 49,108

2 Claims. (Cl. 179—100.2)

This invention relates to a new and improved sound reproduction apparatus and more particularly to apparatus of this character utilizing a magnetic tape sound record.

The present invention relates to a combination and arrangement of elements for producing sound for relatively short periods with provisions for repeating the sound as desired. The specific means for reproducing the sound from the tape form no part of the present invention, as any standard type of reproducing head and any usual electronic amplifying means may be used.

The construction of this invention is designed for advertising purposes and is of the type controlled by a photoelectric cell and circuit operated by interruption of a beam of light directed upon the cell. The apparatus is adapted to be placed upon a store counter and to be placed in operation by a purchaser. The machine will then give a short sales talk or advertising talk and automatically cease operation until put in operation by a subsequent breaking of the light beam. The machine is so designed as to capture the interest of the customer by reason of the fact that certain of the operating parts and the sound tape are visibly displayed. This tends to cause the customer to pause long enough to hear the complete advertising talk from the machine.

It is an object of the present invention to provide a new and improved sound reproduction apparatus.

It is a further object to provide such an apparatus adapted for advertising purposes and with certain of the moving parts visibly displayed.

It is an additional object to provide apparatus using a sound tape and providing means for passing the tape repeatedly past a sound head, together with means for preventing kinking or damage to the tape.

It is also an object to provide apparatus in which the operation may be estopped by means carried by the tape.

It is another object to provide a construction which is simple in construction and operation and designed for commercial production and use.

Other and further objects will appear as the description proceeds.

A face view of the apparatus as it appears in actual use is shown in the single figure of the drawing.

The apparatus comprises a box or container having the front flanges 11 holding in place a transparent sheet of glass or plastic 12 through which certain of the operating parts are visible.

Immediately in the rear of the glass 12 and substantially parallel thereto is a partition member which may be opaque or translucent. This member is spaced rearwardly from the glass a distance only slightly greater than the width of the recording tape 14 which is shown in edge view in the drawing. This tape is driven by means of a capstan pulley 16, the pulley being rotated by motor 17 indicated in broken lines and located in the rear of the partition. The tape is held against the capstan 16 by means of the idler pulley 18 which is carried on arm 19 pivoted at point 20. The tension spring 22 has one end connected to the lever 19 and the other end connected at 23 to a stud supported on the partition so that the idler pulley 18 is yieldingly urged against the capstan or against the tape.

A fixed guide member 25 has its lower end secured at 26 to the partition member adjacent the pick-up head or reproducing head 28. The upper end 29 of the guide 25 is curved and extends to a point adjacent the capstan pulley 16. This pulley 16 has a groove cut into its cylindrical face, as indicated by the broken lines at 32, and the curved portion 29 of member 25 carries a tongue 33 which fits into the groove. This serves the purpose of guiding the tape 14 away from the capstan pulley should there be any tendency for it to stick to the pulley.

The upper curved portion 29 of the guide also carries a flange 35 which guides the tape 14 onto the pulley 16. From a capstan pulley 16, the tape is delivered to a large vertically extending space, as shown, and passes downwards to deposit itself by gravity in folds as illustrated in the drawing.

It will be understood that the apparatus will normally be constructed and placed so that the view shown in the drawing is substantially a vertical face view. Thus, the tape gradually moves down by gravity and folds itself, as shown, until it is drawn off by the drive mechanism.

At the bottom of the space, the tape passes between the rounded guide 37 and a similar guide 38. The guide 38 carries an extended guide member 39 which is inclined towards the reproduction head 28. This guide is fixed in position as shown. The movable guide arm 41 is pivoted at 42 and its cylindrical end guide portion 43 is urged upwardly by the coil spring 45. This serves to press the tape against the under face of the fixed guide 39 and also causes it to have the proper arcuate contact with the reproduction head 28. The guide member 47 is pivoted at 48 and carries a pad 49 which may be formed of felt or similar material. This guide arm 47 is urged in a counter-clockwise direction about its pivot 48 by means of the compression spring 51. Thus, the tape is held in proper operating contact with the reproducing head or pick-up 28.

It will be understood that some types of such heads are so proportioned that it may be necessary to cut a corresponding circular opening through the transparent face plate 12 to permit the head to be properly located relative to the tape carried between the transparent face plate and the adjacent partition.

From the pick-up 28, the tape passes upwardly, past guide 53 and into contact with the curved portion 29 of guide member 25. The switch operating arm 56 is pivoted at 57 and engages the tape at the point where it passes around the guide member 53. The arm 56 extends downwardly and, at point 58, there is a rearwardly projecting lug which engages the arm 60 of the switch 61. It will be understood that the switch 60 is located behind the partition member and that the lug 58 passes through an elongated opening 63 in that partition.

The tape 14 is shown as having a projection thereon at 64. This projection may be merely a relatively thin piece of adhesive tape secured to the outer face of the recording tape. A number of these projections may be applied to the tape, if desired.

The photoelectric cell 66 is located in the rear of the partition at the upper right-hand corner, as shown, and the partition is provided with the opening 67 through which the light sensitive portion of the tube may be exposed. Any suitable source of light may be used with this photoelectric cell, as is well-known in the art. The light bulb 69 is located behind the translucent partition, when a translucent partition is provided, and is connected in the circuit so that it illuminates the apparatus when the device is in operation.

I have not shown or described the specific operating circuits, as these form no part of the present invention. There are available and well-known to the art, a number of circuits by means of which a photoelectric cell serves to control a motor drive. Any suitable circuit may be used.

In the operation of my apparatus, the tape 14 will have impressed thereon by recording apparatus any desired wording. It will normally be used to carry a sales message and its length is such that it may carry several such messages. The control circuit is such that, when the light being directed through the opening 67 on the photoelectric cell 66 is broken, the drive motor 17 is put in operation and serves to rotate the capstan 16. This rotates in the clockwise direction and serves to pull the tape 14 upwardly from the left side of the pick-up unit 28. As the tape passes the pick-up unit, this unit serves to reproduce the sound impressed on the tape and, through any usual type of sound amplifier, the message carried by the tape is made audible. After the light beam has once been broken, the motor continues to operate and the tape continues to move past the pick-up head 28 regardless of subsequent light conditions. When, however, a projection 64 passes between the guide member 53 in the adjacent portion of the arm 56, the lower portion of that arm is swung to the left or in the clockwise direction, as shown in the drawing. This movement may be accomplished by a very slight projection 64, such as a thickness of adhesive tape, since, due to the length of the arm, the movement of the arm 56 is much amplified at the point where the projection 58 is carried by the arm. Movement of this arm serves to open the switch 61 and stop further movement of the tape by opening the motor circuit and stopping the motor drive. This projection 64 should be of such length relative to the speed of movement of the tape that it maintains the switch 61 in the open position long enough for the operation of the relays or other controls in the circuit. The parts are then in position so that a subsequent breaking of the light beam directed on the photoelectric cell will again start the tape in motion.

It will be understood, as previously stated, that the tape may carry a number of messages and may be stopped after each message by means of a projection 64. On the other hand, if desired, it may contain only one long message.

The transparent covering plate 12 may be easily removed when desired to place a different message tape in position. The guide arrangements are such as to prevent the tape from sticking or curling at any point or becoming entangled in any manner.

Because of the transparent front, the movement of the tape is visible to a customer or other person who is adjacent the apparatus and breaks the light beam. This movement of the tape and associated mechanism serves to attract the attention of such person and will normally maintain his attention an adequate period of time such that he will hear the entire message delivered by the sound reproducer.

The apparatus, thus, serves as an entirely automatic sales adjunct which can be mounted on a sales counter in a store and which will operate without the attention of any of the store employees. It will not operate needlessly, but will operate only when the light is broken by a customer and, consequently, will attract instant attention by coming on from a period of complete silence.

While I have shown certain preferred embodiments of my invention, they are to be understood to be illustrative only, as I contemplate such modifications as come within the spirit and scope of the appended claims.

I claim:

1. Sound reproduction apparatus mounted in a housing having an upwardly extending forward wall, a supporting partition substantially parallel to the forward wall, operating parts including a continuous magnetic tape, means for driving the tape comprising a capstan pulley extending from the upper portion of the supporting partition, said tape having a width to fit loosely between the forward wall supporting partition, a guide member extending transversely of the lower portion of the space between the forward wall and partition, means for guiding the tape around the ends of said guide member, a movable guide arm below the fixed guide member, resilient means urging the guide arm toward the fixed guide, and a reproducing head adjacent one end of the guide member, the tape passing from the guide member around the reproducing head and upwardly to the capstan pulley.

2. Sound reproduction apparatus mounted in a housing having an upwardly extending forward wall, a supporting partition substantially parallel to the forward wall, operating parts including a continuous magnetic tape, means for driving the tape comprising a capstan pulley extending from the upper portion of the supporting partition, said tape having a width to fit loosely between the forward wall and supporting partition, a guide member extending transversely of the lower portion of the space between the forward wall and partition, means for guiding the tape around the ends of said guide member, a swinging guide arm pivoted adjacent the lower face of the fixed guide and extending adjacent the major portion of said fixed guide, resilient means urging the free end of the guide arm toward contact with the under face of the fixed guide, and a reproducing head adjacent one end of the guide member, the tape passing from the guide member around the reproducing head and upwardly to the capstan pulley.

JEFFERSON C. GIBSON.

REFERENCES CITED

The following references are of record in the file of this patent:

UNITED STATES PATENTS

| Number | Name | Date |
|---|---|---|
| 1,297,049 | Webster | Mar. 11, 1919 |
| 1,341,108 | Barnett | May 25, 1920 |
| 1,883,987 | Lasowsky | Oct. 25, 1923 |
| 2,328,539 | Greenleaf | Sept. 7, 1943 |
| 2,422,143 | Somers | Jan. 10, 1947 |

FOREIGN PATENTS

| Number | Country | Date |
|---|---|---|
| 441,479 | Great Britain | Jan. 13, 1936 |
| 678,099 | France | Mar. 18, 1930 |